United States Patent
Zürbig et al.

(10) Patent No.: US 6,173,568 B1
(45) Date of Patent: Jan. 16, 2001

(54) METHOD AND DEVICE FOR OPERATING AN INTERNAL COMBUSTION ENGINE OPERATING WITH AN EXCESS OF AIR

(75) Inventors: Jürgen Zürbig, Burgkunstadt; Rainer Tost, Nürnberg; Winfried Dölling, Weissenbrunn; Reinhard Latsch, Sinsheim, all of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/154,487

(22) Filed: Sep. 16, 1998

(30) Foreign Application Priority Data

Sep. 16, 1997 (DE) ............................................... 197 40 702

(51) Int. Cl.⁷ ...................................................... F01N 3/00
(52) U.S. Cl. ................................ 60/274; 60/286; 60/301; 123/424
(58) Field of Search ............................... 60/274, 285, 301, 60/303, 284, 286, 272, 308, 299, 297; 123/424

(56) References Cited

U.S. PATENT DOCUMENTS 5,367,875  *  11/1994  Aboujaoude et al. ................... 60/303
5,517,820  *   5/1996  Kuroda et al. ........................... 60/274
5,809,774  *   9/1998  Peter-Hoblyn et al. ................ 60/274

FOREIGN PATENT DOCUMENTS

| 196 26 835 A1 | 1/1997 | (DE). |
| 196 26 836 A1 | 1/1997 | (DE). |
| 196 26 837 A1 | 1/1997 | (DE). |
| 0 615 777 A1 | 9/1994 | (EP). |
| 0702134 A2 | 3/1996 | (EP). |

OTHER PUBLICATIONS

International Patent Application WO 97/16632 (Kinugasa et al.), dated May. 9, 1997.
Japanese Patent Abstract No. 63068714 (Nobuhiro), dated Mar. 28, 1988.
Japanese Patent Abstract No. 06272545 (Kiyoshi), dated Sep. 27, 1984.
Japanese Patent Abstract No. 07011947 (Hideji), dated Jan. 13, 1995.
Japanese Patent Abstract No. 09088560 (Hisashi), dated Mar. 31, 1997.

* cited by examiner

*Primary Examiner*—Jeanette Chapman
*Assistant Examiner*—Sneh Varma
(74) *Attorney, Agent, or Firm*—Herbert L. Lerner; Laurence A. Greenberg; Werner H. Stemer

(57) ABSTRACT

A bypass leads away from the exhaust pipe and the bypass flow is set with an electrically actuable exhaust gas valve. Under certain operating states of the internal combustion engine, in particular when the load is increasing rapidly or during warmup, a portion or the entire exhaust gas flow is diverted through a combined hydrolysis/adsorption catalytic converter in the bypass line. The $NO_x$ contained in the exhaust gas is adsorbed in a particularly favorable manner.

14 Claims, 1 Drawing Sheet

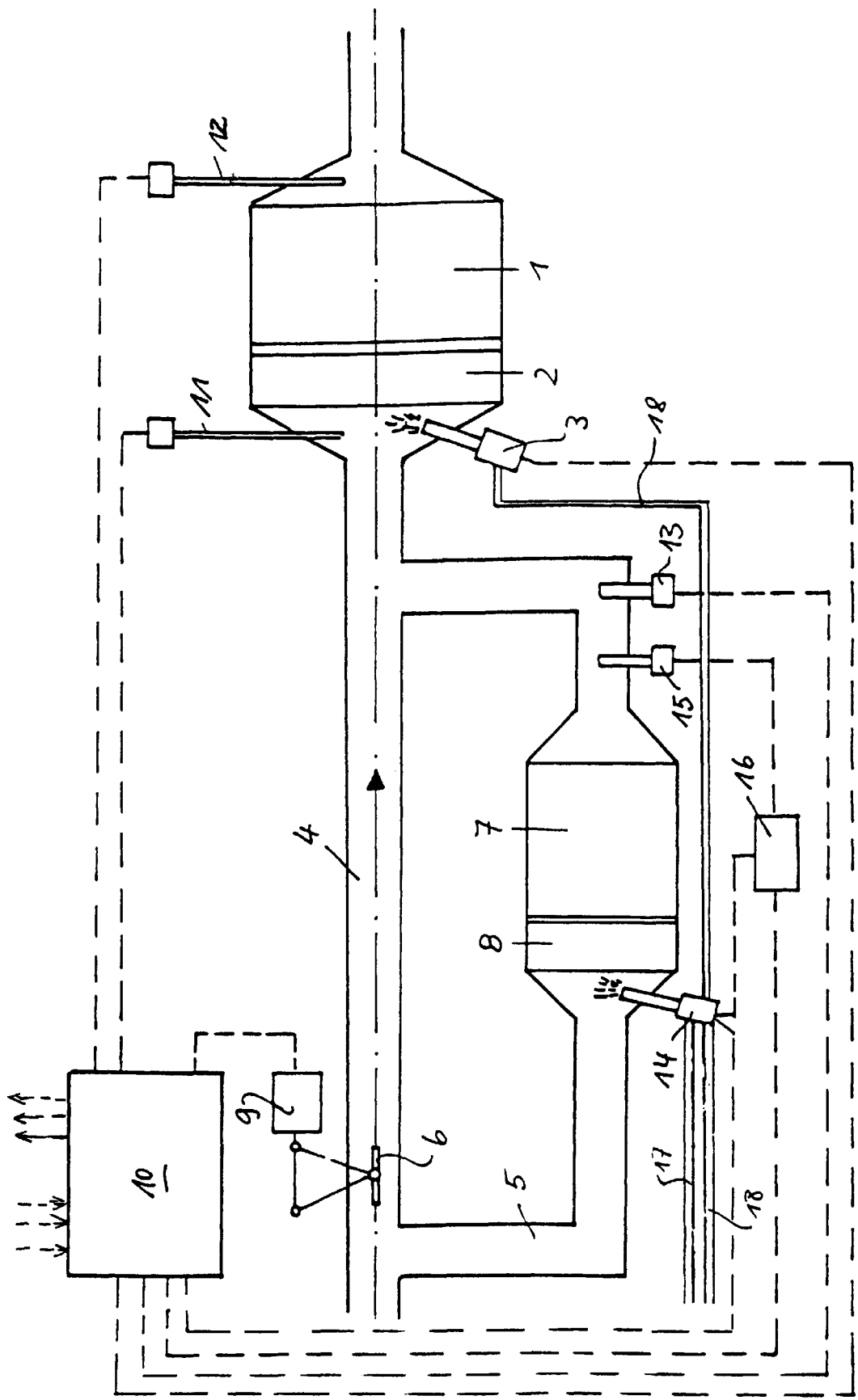

METHOD AND DEVICE FOR OPERATING AN INTERNAL COMBUSTION ENGINE OPERATING WITH AN EXCESS OF AIR

BACKGROUND OF THE INVENTION

1. Field of the Invention

The invention belongs in the automotive field. More specifically, the invention pertains to a method and a device for operating an internal combustion engine which runs with an excess of air. The exhaust gas flow is thereby guided, by means of a main exhaust pipe over an $NO_x$ catalytic converter unit with an SCR catalytic converter and a device for injecting a reducing agent. The load state of the internal combustion engine is thereby constantly determined in the process.

The emissions of nitrogen oxides from an internal combustion engine which is operated with an excess of air, in particular a diesel internal combustion engine, can be reduced with an ammonia-containing reducing agent on a selectively operating catalytic converter (SCR catalyst) to form $N_2$ and $H_2O$ (SCR=Selective Catalytic Reduction). The reducing agent is either gaseous ammonia ($NH_3$), ammonia in aqueous solution, or urea in aqueous solution. If urea is used as the reducing agent, the urea is injected into the exhaust system upstream of a hydraulysis catalytic converter, where it is converted by means of hydrolysis into ammonia, which then for its part reduces the nitrogen oxides in the actual SCR catalytic converter. With such a method, when the internal combustion engine load is increased rapidly, the result is a particularly high $NO_x$ emission. The main reason for this is that when the load is increased the emission of crude $NO_x$ from the internal combustion engine increases suddenly. At the same time, the adsorption capacity of the SCR catalyst falls with the rise in temperature of the exhaust gas and catalyst.

An additional problem arises in warmup operation, when the catalyst has not yet reached its operating temperature or light-off temperature. In this case, the nitrogen oxides are not converted. By reducing the $NO_x$ emissions further in both the above-mentioned operating states, the average conversion in the exhaust gas test could be increased considerably.

U.S. Pat. No. 5,362,463 to Stiles (published international application WO 94/04258) describes a method for the catalytic conversion of the nitrogen oxides contained in the exhaust gas from an internal combustion engine. There, a conventional DeNox method with the addition of reducing agents is combined with a $NO_x$ adsorber. In this case, the $NO_x$ adsorber plays the main role in reducing the $NO_x$ emissions, in that in each case the adsorber is loaded up and the exhaust gas produced by desorption of the adsorber is fed to a DeNox catalyst. Such a method has the drawback that the SCR catalyst is adjusted to the particular amount of exhaust gas with a high $NO_x$ concentration only to an unsatisfactory extent. In addition, previous adsorber systems had a service life which was unsatisfactory. This applies particularly in the context of sulfur-containing fuels.

Further methods comprising the simultaneous use of $NO_x$ adsorbers and DeNox systems are described in German published applications DE 196 26 835, DE 196 26 836, DE 196 26 837 and in European patent application EP 0 702 134.

The exhaust gas system described in DE 196 26 835 has two exhaust gas paths which can alternately be opened by a valve, an $NO_x$ storage catalyst being provided in one path and an oxidation catalyst being provided in the other path. A fuel injection, which is controlled via a lambda probe arranged downstream of the $NO_x$ storage catalyst, is connected upstream of the $NO_x$ storage catalyst. After the two exhaust gas paths have been combined, an oxidation catalyst is provided. In overrun conditions and idling conditions of the diesel internal combustion engine, the valve closes the exhaust gas path containing the $NO_x$ storage catalyst from the exhaust gas flow, so that there is only a minimum flow through the $NO_x$ storage catalyst. At the same time, by injecting fuel into the minimum through-flow a lambda value $\lambda<1$ is produced, so that the $NO_x$ storage catalyst is regenerated.

2. Summary of the Invention

It is accordingly an object of the invention to provide a method and device for operating an internal combustion engine operating with an excess of air title, which overcomes the above-mentioned disadvantages of the heretofore-known devices and methods of this general type and which further reduces the $NO_x$ emissions during transient conditions, in particular when the load is increased on the internal combustion engine and in warmup mode, by comparison with what can be achieved using conventional SCR systems. In addition, it is intended to match the service life of the entire system to the service life of the vehicle, i.e. the period for which exhaust gas can be applied to the adsorber is to be limited to a minimal time period.

With the foregoing and other objects in view there is provided, in accordance with the invention, a method of operating an internal combustion engine running with an excess of air, which comprises:

conducting an exhaust gas flow through a main exhaust pipe and through a $NO_x$ catalytic converter unit having at least an SCR catalytic converter and a device for injecting reducing agent into the exhaust gas flow;

constantly determining a load state of the internal combustion engine during the conducting step;

if the load of the internal combustion engine increases rapidly or if the internal combustion engine is in warmup operation, diverting at least part of the exhaust gas flow via a bypass system and to an adsorption catalytic converter; and loading the adsorption catalytic converter by guiding the exhaust gas through a series circuit comprising the adsorption catalytic converter and the SCR catalytic converter.

By incorporating a bypass to the exhaust pipe by means of an electrically actuable exhaust gas valve, under certain operating states of the internal combustion engine, in particular when the load is increasing rapidly or during warmup, part or all of the exhaust gas flow can be guided over the adsorption catalyst, which is then generally relatively cool. The $NO_x$ contained in the exhaust gas is then adsorbed in a particularly favorable manner.

In accordance with an added feature of the invention, the diverting step comprises driving an exhaust gas valve disposed in the main exhaust pipe with an electric actuator and diverting the gas flow from the main exhaust pipe and into the bypass system.

In accordance with an additional feature of the invention, the diverting step comprises switching over the exhaust gas flow to the bypass system in dependence of an accelerator pedal position driving the internal combustion engine or a change over time of the accelerator pedal position.

In accordance with another feature of the invention, the diverting step comprises switching over the exhaust gas flow to the bypass system in dependence on a fuel injection volume of the internal combustion engine.

In accordance with a further feature of the invention, the diverting step comprises switching over the exhaust gas flow to the bypass system in dependence on one of the temperature of the SCR catalytic converter and the temperature of the exhaust gas upstream and downstream of the SCR catalytic converter.

In accordance with again an added feature of the invention, a hydrolysis catalytic converter is provided upstream of the SCR catalytic converter in the gas flow direction.

In accordance with again an additional feature of the invention, the exhaust gas flow is guided over a hydrolysis catalytic converter connected upstream of the adsorption catalytic converter and in the bypass system, and a desorption operation is initiated at specific time intervals by briefly supplying fuel or a reducing agent.

In accordance with again another feature of the invention, the initiating step comprises initiating the desorption operation when a level of $NO_x$ loading on the adsorption catalytic converter has exceeded a predetermined threshold value.

In accordance with again a further feature of the invention, the level of $NO_x$ loading on the adsorption catalytic converter is determined with a $NO_x$ sensor disposed downstream of the adsorption catalytic converter in the gas flow direction.

Finally, the level of $NO_x$ loading on the adsorption catalytic converter may be determined by means of a mathematical model relationship.

With the above and other objects in view there is also provided, in accordance with the invention, a device for operating an internal combustion engine running with an excess of air, comprising:

a $NO_x$ catalytic converter unit including an SCR catalytic converter and a device for injecting reducing agent;

a main exhaust pipe leading from an internal combustion engine to the $NO_x$ catalytic converter unit;

a controllable exhaust gas valve disposed in the main exhaust pipe upstream of the $NO_x$ catalytic converter unit in an exhaust gas flow direction;

a bypass line branching off from the main exhaust pipe upstream of the exhaust gas valve and merging back into the main exhaust pipe upstream of the $NO_x$ catalytic converter unit; and an adsorption catalytic converter integrated in the bypass line.

In accordance with yet an added feature of the invention, there is provided a hydrolysis catalytic converter with a device for supplying urea disposed upstream of the SCR catalytic converter.

In accordance with yet a further feature of the invention, a hydrolysis catalytic converter with a device for supplying one of fuel and reducing agent is disposed upstream of the adsorption catalytic converter.

In accordance with a concomitant feature of the invention, an exhaust gas sensor is disposed downstream of the adsorption catalytic converter, and a control unit receives an output signal from the exhaust gas sensor for adjusting a volume of fuel or reducing agent to be supplied.

Other features which are considered as characteristic for the invention are set forth in the appended claims.

Although the invention is illustrated and described herein as embodied in a method and device for operating an internal combustion engine which runs with an excess of air, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a schematic view of an exhaust gas system of an internal combustion engine.

DESCRIPTION OF THE PREFERRED EMBODIMENTS

A main exhaust pipe 4 connects to the exhaust manifold of a non-illustrated internal combustion engine. An SCR or a DeNox catalytic converter 1 is bound into the exhaust pipe 4. A hydrolysis catalytic converter 2 is disposed just upstream of the converter 1 in the direction of exhaust gas flow. A metering valve 3 for a reducing agent, for example urea, injects upstream of the hydrolysis catalytic converter 2. The role of the hydrolysis catalyst is to produce the reducing agent ammonia from the urea which is metered in aqueous solution. Then, with the aid of the ammonia, the nitrogen oxides are converted, in the $NO_x$ reducing part, namely the SCR catalytic converter, into the nonhazardous components nitrogen, carbon dioxide and water. In addition, the SCR catalytic converter also acts as an oxidation catalyst for hydrocarbons.

The reducing agent is conveyed from a storage reservoir (not shown) by means of a pump and is supplied to the metering valve 3 via a reducing agent line 18.

Temperature sensors 11, 12 record the temperature of the exhaust gas upstream and downstream of the SCR catalytic converter.

An exhaust gas valve 6, which can be pivoted by means of an actuator 9, is provided in the main exhaust pipe 4, so that the passage cross section of the main exhaust pipe 4 can be changed. A bypass line 5, in the further path of which an adsorption catalytic converter 7, with an upstream hydrolysis catalytic converter 8, is arranged, branches off from the main exhaust pipe 4. The branch deflection is disposed upstream of the exhaust gas valve 6 in the exhaust gas flow direction. At a location upstream of the hydrolysis catalytic converter 2, the bypass line 5 opens back into the main exhaust pipe 4.

A $NO_x$ sensor 13 disposed downstream of the adsorption catalytic converter 7 is used to determine the state of loading of the adsorption catalytic converter 7. As an alternative, the state of loading of the adsorption catalytic converter 7 can be determined by means of a mathematical model.

Moreover, an exhaust gas sensor 15 is disposed downstream of the adsorption catalytic converter 7. The signal from the sensor 15 is transmitted to a controller 16 and is used to feed a desired air ratio and hence a suitable quantity of fuel, e.g. diesel fuel, via a fuel line 17 or, alternatively, reducing agent, e.g. urea, via the above-mentioned reducing agent line 18 to the hydrolysis/adsorption catalytic converter 7, 8. Stored $NO_x$ is thereby desorbed.

An electronic control device 10 controls the exhaust gas aftertreatment system. For this purpose, in addition to the signals from the above-mentioned sensors, further signals which are required to operate the internal combustion engine, such as for example rotational speed, controlled travel, charging pressure, charge air temperature, etc., are fed to the control device 10. Advantageously, such communication is through a CAN bus. On the output side, the control device 10 is connected, via lines which are not shown in more detail, to the controller 16, the metering valve 3, the injection nozzle 14 and the actuator 9 for the exhaust gas valve 6. Moreover, it actuates the pump for the reducing agent, evaluates signals from a level sensor for the reducing agent and actuates a heating device for the reducing agent reservoir.

When the load is increased rapidly and/or during warmup of the internal combustion engine, the actuator 9 is controlled in such a manner that the exhaust gas valve 6 guides part or all of the exhaust gas flow into the bypass line 5. Particularly when the load is increasing rapidly, the exhaust gas is diverted over the adsorber catalytic converter 7, which is generally cool, the $NO_x$ contained in the exhaust gas being adsorbed in a particularly effective manner.

The exhaust gas valve 6 is adjusted by means of the actuator 9 as a function of various operating parameters, such as for example accelerator pedal position and/or its change over time, fuel injection volume of the internal combustion engine and/or its change over time, exhaust gas temperature upstream and downstream of the SCR catalytic converter or temperature of the SCR catalytic converter itself.

In order to rapidly heat the SCR catalytic converter 1 and to maintain it at a high temperature, during loading of the adsorption catalytic converter 7, the latter and also the SCR catalytic converter are connected in series, and therefore, as a result of the closed exhaust gas valve 6, the exhaust gas flow is guided via the bypass line 5.

After the adsorption catalytic converter 7 has been laden with $NO_x$, desorption takes place by briefly supplying fuel or reducing agent via the injection nozzle 14. By means of the signal from the exhaust gas sensor 15 and the controller 16, a desired air ratio, and hence the appropriate volume of fuel or reducing agent to be supplied, is adjusted, so that the stored $NO_x$ is desorbed. In order to accurately monitor the adsorption/desorption state of the adsorption catalytic converter 7, this is monitored with the aid of the $NO_x$ sensor.

During the desorption operation, the exhaust gas valve 6 is moved into a position in which some of the exhaust gas flow flows through the bypass line 5, and hence over the adsorption catalytic converter 7, in order to ensure a sufficiently high temperature.

The invention has been explained on the basis of an example in which urea is supplied in aqueous solution upstream of a hydrolysis catalytic converter. If fuel or ammonia is used as the reducing agent, there is no need for such a hydrolysis catalytic converter, and the reducing agent is then supplied directly to the adsorption catalytic converter.

We claim:

1. A method of operating an internal combustion engine running with an excess of air, which comprises:

conducting an exhaust gas flow through a main exhaust pipe and through a $NO_x$ catalytic converter unit having at least an SCR catalytic converter and a device for injecting reducing agent into the exhaust gas flow;

constantly determining a load state of the internal combustion engine during the conducting step;

if the load of the internal combustion engine increases rapidly, diverting at least part of the exhaust gas flow via a bypass system and to an adsorption catalytic converter;

if the internal combustion engine is in warmup operation, diverting at least part of the exhaust gas flow via a bypass system and to an adsorption catalytic converter; and guiding the exhaust gas flowing through the bypass system through the adsorption catalytic converter and the SCR catalytic converter.

2. The method according to claim 1, wherein the diverting step comprises driving an exhaust gas valve disposed in the main exhaust pipe with an electric actuator and diverting the gas flow from the main exhaust pipe and into the bypass system.

3. The method according to claim 1, wherein the diverting step comprises switching over the exhaust gas flow to the bypass system in dependence of an accelerator pedal position driving the internal combustion engine or a change over time of the accelerator pedal position.

4. The method according to claim 1, wherein the diverting step comprises switching over the exhaust gas flow to the bypass system in dependence on a fuel injection volume of the internal combustion engine.

5. The method according to claim 1, which further comprises sensing one of a temperature of the SCR catalytic converter and a temperature of the exhaust gas flow upstream and downstream of the SCR catalytic converter in the gas flow direction, and wherein the diverting step comprises switching over the exhaust gas flow to the bypass system in dependence on one of the temperature of the SCR catalytic converter and the temperature of the exhaust gas upstream and downstream of the SCR catalytic converter.

6. The method according to claim 1, which comprises providing a hydrolysis catalytic converter upstream of the SCR catalytic converter in the gas flow direction.

7. The method according to claim 1, which comprises guiding the exhaust gas flow over a hydrolysis catalytic converter connected upstream of the adsorption catalytic converter and in the bypass system, and initiating a desorption operation at specific time intervals by briefly supplying fuel or a reducing agent.

8. The method according to claim 7, wherein the initiating step comprises initiating the desorption operation when a level of $NO_x$ loading on the adsorption catalytic converter has exceeded a predetermined threshold value.

9. The method according to claim 8, which comprises determining the level of $NO_x$ loading on the adsorption catalytic converter with a $NO_x$ sensor disposed downstream of the adsorption catalytic converter in the gas flow direction.

10. The method according to claim 9, which comprises determining the level of $NO_x$ loading on the adsorption catalytic converter by means of a mathematical model relationship.

11. A device for operating an internal combustion engine running with an excess of air, comprising:

a $NO_x$ catalytic converter unit including an SCR catalytic converter and a device for injecting reducing agent;

a main exhaust pipe leading from an internal combustion engine to said $NO_x$ catalytic converter unit;

a controllable exhaust gas valve disposed in said main exhaust pipe upstream of the $NO_x$ catalytic converter unit in an exhaust gas flow direction;

a bypass line branching off from said main exhaust pipe upstream of said exhaust gas valve and merging back into said main exhaust pipe upstream of said $NO_x$ catalytic converter unit; and an adsorption catalytic converter integrated in said bypass line.

12. The device according to claim 11, which further comprises a hydrolysis catalytic converter with a device for supplying urea disposed upstream of said SCR catalytic converter.

13. The device according to claim 11, which further comprises a hydrolysis catalytic converter with a device for supplying one of fuel and reducing agent disposed upstream of said adsorption catalytic converter.

14. The device according to claim 13, which further comprises an exhaust gas sensor disposed downstream of said adsorption catalytic converter, and a control unit receiving an output signal from said exhaust gas sensor, said control unit adjusting a volume of fuel or reducing agent to be supplied.

* * * * *